(12) United States Patent
Tang et al.

(10) Patent No.: US 6,214,414 B1
(45) Date of Patent: Apr. 10, 2001

(54) METHOD FOR FORMING A SEQUENCE OF CROSSLINKED PIGMENTED COATINGS ON CERAMIC SUBSTRATES

(75) Inventors: Robert H. Tang; Yingchao Zhang, both of Murrysville; Louis J. Nehmsmann, Apollo; Alan E. Wang, Gibsonia; George D. Morris, Cranberry Township, Butler County; Robert A. Montague, Allison Park, all of PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/359,471

(22) Filed: Jul. 22, 1999

(51) Int. Cl.$^7$ ................... B05D 1/36; B05D 3/02
(52) U.S. Cl. ............ 427/333; 427/407.2; 427/386; 427/389.7; 427/393.6
(58) Field of Search .................. 427/407.2, 333, 427/386, 389.7, 393.6

(56) References Cited

U.S. PATENT DOCUMENTS

| | | | |
|---|---|---|---|
| 2,765,288 | * 10/1956 | Whittier et al. | 260/28 |
| 2,965,610 | * 12/1960 | Newey | 260/17 |
| 3,062,771 | * 11/1962 | Boenau et al. | 260/33.6 |
| 3,373,131 | * 3/1968 | Bolstad et al. | 260/31.8 |
| 3,378,509 | * 4/1968 | Jerabek | 260/21 |
| 3,386,848 | * 6/1968 | Dereich | 117/38 |
| 3,413,258 | * 11/1968 | Bolstad et al. | 260/33.8 |
| 3,468,835 | * 9/1969 | Dereich | 260/33.4 |
| 3,471,312 | * 10/1969 | Muenchinger et al. | 117/38 |
| 3,607,349 | * 9/1971 | Dereich | 117/38 |
| 3,666,539 | * 5/1972 | Kiel | 117/124 F |
| 3,872,044 | * 3/1975 | Hervey et al. | 260/30.8 R |
| 3,947,339 | * 3/1976 | Jerabek et al. | 204/181 |
| 4,680,346 | * 7/1987 | Carson et al. | 427/407.1 |
| 4,801,680 | * 1/1989 | Geary et al. | 528/272 |
| 5,095,087 | * 3/1992 | Witzeman et al. | 528/45 |
| 5,202,162 | * 4/1993 | Hart, Jr. et al. | 427/282 |
| 5,231,156 | * 7/1993 | Lin | 526/279 |
| 5,302,458 | 4/1994 | Blum et al. | 428/429 |
| 5,346,933 | * 9/1994 | Knell | 523/427 |
| 5,411,768 | * 5/1995 | Knell et al. | 427/386 |
| 5,487,927 | * 1/1996 | Kamen et al. | 128/34.4 |
| 5,562,951 | * 10/1996 | Kamen | 427/493 |
| 5,571,359 | * 11/1996 | Kamen et al. | 156/233 |
| 5,656,336 | * 8/1997 | Kamen et al. | 427/511 |

FOREIGN PATENT DOCUMENTS

| | | |
|---|---|---|
| 0 001 148A1 | 3/1979 | (EP) . |
| 0 065 203A2 | 11/1982 | (EP) . |
| 0 519 074A1 | 12/1992 | (EP) . |
| WO 97/13816 | * 4/1997 | (WO) . |
| WO 98/30643 | * 7/1998 | (WO) . |

OTHER PUBLICATIONS

Messerschmitt, Dr. Elmar, Screenprinting with Thermoplastic (Hot Melt) Inks on Glass and Ceramics, Glass, Apr. 1990, pp. 150–152.*

D. Beyer et al., "Covalently attached polymer mono–and multilayers on Silanized glass substrates", Thin Solid Films, vol. 284–285 (1996) 825–828.

* cited by examiner

Primary Examiner—Erma Cameron
(74) Attorney, Agent, or Firm—George D. Morris

(57) ABSTRACT

A method comprising heating to elevated temperature a ceramic substrate having thereon a sequence of coatings of pigmented coating compositions wherein each of said pigmented coating compositions comprises: (a) reactive organic resin which is polyhydroxy-functional, polyepoxy-functional, or both epoxy-functional and hydroxy-functional; (b) reactive wax; (c) color-imparting pigment; and (d) blocked polyisocyanate; wherein: (e) the pigmented coating composition of at least one coating of the sequence is substantially free of amino-functional curing agent; and (f) the pigmented coating composition of at least one other coating of the sequence further comprises amino-functional curing agent; to crosslink all of the pigmented coating compositions of the coatings of the sequence and to adhere the sequence to the ceramic substrate. The preferred ceramic substrates are glass bottles. The outermost coating of the sequence may optionally be overlain with a coating of substantially clear overcoating composition which comprises reactive organic resin which is polyhydroxy-functional, polyepoxy-functional, or both epoxy-functional and hydroxy-functional. Upon heating to the elevated curing temperature, the substantially clear overcoating composition is crosslinked together with the pigmented coating compositions.

26 Claims, No Drawings

METHOD FOR FORMING A SEQUENCE OF CROSSLINKED PIGMENTED COATINGS ON CERAMIC SUBSTRATES

BACKGROUND OF THE INVENTION

Ceramic substrates, especially those of glass, are often coated, either locally or completely, with one or more coating compositions. Local application is usually practiced to apply lettering, designs, or other indicia to the ceramic substrates; when used in this manner the coating compositions are generally referred to as "inks". Application of indicia to glass bottles is a commercially important example.

The coatings applied to bottles must be tough and resistant to marring by abrasion or impact and they should be resistant to degradation by caustic solutions commonly is employed for cleaning bottles.

Many of the bottle coatings now used are "applied ceramic labels", that is, they are applied as inorganic frits which are then exposed to high temperatures. Applied ceramic labels, however, suffer from one or more disadvantages, such as the presence of heavy metals, low gloss, low color brilliance, the necessity of using high temperatures to melt the frits after application, and often a requirement to subsequently reanneal the labeled bottles.

Organic coatings have been used for bottle coatings, but resistances to abrasion and impact of many of these coatings are typically low, and resistances to degradation by caustic bottle-cleaning solutions have often also been low.

Organic coatings based primarily on epoxy resins, dicyandiamide curing agent, and reactive siloxane, and usually containing various additional components, are known. See, for example, the following United States patents: U.S. Pat. No. 3,468,835, U.S. Pat. No. 3,471,312, U.S. Pat. No. 3,607,349, U.S. Pat. No. 5,346,933, and U.S. Pat. No. 5,411,768.

Unfortunately, due primarily to the presence of the dicyandiamide curing agent, some crosslinking of the coating composition does occur at application temperatures and such crosslinking eventually causes the coating composition to thicken to the point it cannot be applied. Accordingly, a major problem with the prior coatings has been short pot life, where "pot life" is the length of time the coating will remain fluid enough to apply to substrates at application temperatures.

THE INVENTION

It has now been found that heating to elevated temperature a ceramic substrate having thereon a sequence of coatings of pigmented coating compositions wherein the is pigmented coating composition of at least one coating of the sequence is substantially free of amino-functional curing agent, and the pigmented coating composition of at least one other coating of the sequence comprises amino-functional curing agent, serves to crosslink all of the pigmented coating compositions of the coatings of the sequence.

Accordingly, the invention is a method comprising heating to elevated temperature a ceramic substrate having thereon a sequence of coatings of pigmented coating compositions wherein each of said pigmented coating compositions comprises: (a) reactive organic resin which is polyhydroxy-functional, polyepoxy-functional, or both epoxy-functional and hydroxy-functional; (b) reactive wax; (c) color-imparting pigment; and (d) blocked polyisocyanate; wherein: (e) the pigmented coating composition of at least one coating of the sequence is substantially free of amino-functional curing agent; and (f) the pigmented coating composition of at least one other coating of the sequence further comprises amino-functional curing agent; to crosslink all of the pigmented coating compositions of the coatings of the sequence and to adhere the sequence to the ceramic substrate.

Because one or more of the pigmented coating compositions are substantially free of amino-functional curing agent, they exhibit much longer pot lives than those which contain amino-functional curing agent. Frequently the pot lives of the pigmented coating compositions which are substantially free of amino-functional curing agent are longer than many of the coating compositions of the prior art. Although it is not desired to be bound by any theory or mechanism, it is believed that the effect of the amino-functional curing agent during crosslinking is able to diffuse to the coating or coatings which did not originally contain a significant amount of amino-functional curing agent.

For purposes of the present invention, inks are considered to be coating compositions.

The reactive organic resin which is polyhydroxyfunctional and which is used in the invention, may be widely varied. A class of polyhydroxy-functional reactive organic resin which is frequently employed comprises the polyhydroxy-functional polyester resins. As used herein and in the claims, the term "polyhydroxy-functional" means that on a number average molecular weight basis, the polyester contains on average, more than one hydroxyl group per molecule. Preferably the polyester contains, on average, at least two hydroxyl groups per molecule.

The polyhydroxy-functional polyester resins which can be used in the present invention are numerous and widely varied. Such polyhydroxy-functional polyesters are preferably polyhydroxy-functional substantially saturated polyester resins, as that term is customarily understood in the industry. As used herein and in the claims, the term "saturated polyester" is intended to include polyesters containing aromatic unsaturation since aromatic unsaturation is generally unreactive in polyesters. Nevertheless, some ethylenic unsaturation may be present when circumstances warrant. Ethylenic unsaturation, when present, is often introduced by employing a small amount of ethylenically unsaturated acid such as maleic acid or fumaric acid, during preparation of the polyester. Usually less than 10 mole percent of the acids used to prepare the hydroxy-functional polyesters employed in the present invention are ethylenically unsaturated acids. Often less than 5 mole percent of the acids used to prepare the hydroxy-functional polyesters are ethylenically unsaturated acids. Preferably the ethylenically unsaturated acids are substantially absent.

The polyhydroxy-functional polyesters may be produced from one or more polyols and one or more polycarboxylic acids using well-known polycondensation procedures employing an excess of polyol to obtain a polymer having the desired proportion of hydroxyl groups. Examples of such procedures include, but are not limited to, direct esterification of polycarboxylic acid (or its anhydride if such anhydride exists) with polyol, transesteresterification, and reaction between polycarboxylic acid halide and the polyol. Notwithstanding the method of preparation used, it is convenient to classify polyhydroxy-functional polyesters according to the polyols and polycarboxylic acids which were used in direct esterification, or which would be used in a theoretical direct esterification.

The polyols which can be used are numerous and widely varied. They are often aliphatic, alicyclic, aromatic, aliphatic-alicyclic, aliphatic-aromatic, alicyclic-aromatic, or aliphatic-alicyclic-aromatic in nature. Usually the polyols contain from 2 to 20 carbon atoms. Frequently the polyols contain from 2 to 12 carbon atoms. The polyols are usually predominately diols. In most instances diols constitute at least 90 mole percent of the polyols. Often diols constitute at least 95 mole percent of the polyols. At least 98 mole percent is preferred. Frequently diols constitute all of the polyols.

Examples of suitable diols include ethylene glycol, diethylene glycol, triethylene glycol, tetraethylene glycol, propylene glycol, 1,3-propanediol, dipropylene glycol, trimethylene glycol, 2,4-dimethyl-2-ethylhexane-1,3-diol, 2,2-dimethylpropane-1,3-diol, 2-ethyl-2-butylpropane-1,3-diol, 2-ethyl-2-isobutylpropane-1,3-diol, 1,3-butanediol, 1,5-pentanediol, 1,5-hexanediol, 1,6-hexanediol, thiodiethanol, 1,2-cyclohexanediol, 1,3-cyclohexanediol, 1,4-cyclohexanediol-1,2-cyclohexanedimethanol, 1,3-cyclohexanedimethanol, 1,4-cyclohexanedimethanol, 2,2,4,4-tetramethylcyclobutane-1,3-diol, 1,4-xylylenediol, 3-hydroxy-2,2-dimethylpropyl 3-hydroxy-2,2-dimethylpropanoate, 4,4'1-(1-methylethylidene)bis[cyclohexanol],and 4,4'-(1-methylethylidene)bis[phenol]. A minor amount, that is, up to 10 mole percent of the polyol may be triol, tetrol, or higher functional polyol. Examples include, but are not limited to, glycerol, 1,1,1-trimethylolethane, 1,1,1-trimethylolpropane, erythritol, pentaerythritol, dipentaerythritol, sorbitol, mannitol, α-methylglucoside, and sorbitan.

The polycarboxylic acids which can be used are also numerous and widely varied. They are often aliphatic, alicyclic, aromatic, aliphatic-alicyclic, aliphatic-aromatic, alicyclic-aromatic, or aliphatic-alicyclic-aromatic in nature. Usually they contain from 4 to 20 carbon atoms. The polycarboxylic acids are usually predominately dicarboxylic acids. In most instances dicarboxylic acids constitute at least 90 mole percent of the polycarboxylic acids. Often dicarboxylic acids constitute at least 95 mole percent of the polycarboxylic acids. At least 98 mole percent is preferred. Frequently dicarboxylic acids constitute all of the polycarboxylic acids.

Examples of suitable dicarboxylic acids include succinic acid, glutaric acid, adipic acid, pimelic acid, suberic acid, azelaic acid, sebacic acid, undecanedioic acid, dodecanedioic acid, phthalic acid, isophthalic acid, terephthalic acid, 1,3-cyclohexanedicarboxylic acid, and 1,4-cyclohexanedicarboxylic acid. A minor amount, that is, up to 10 mole percent of the polycarboxylic acid may be tricarboxylic acid or higher functional polycarboxylic acid. Examples include, but are not limited to, trimellitic acid and is 1,2,3-propanetrioic acid.

The hydroxy-functionality of the polyhydroxy-functional polyester resins which are used in the present invention is conveniently characterized by the hydroxyl number, which is well known and may be determined according to the procedure of ASTM E 222-94, the entire disclosure of which is incorporated herein by reference. Usually the polyhydroxy-functional polyester resins have a hydroxyl number of at least 5. In many instances the hydroxyl number is in the range of from 5 to 200.

The number average molecular weight of the polyhydroxy-functional polyester resin is usually in the range of from 500 to 10,000, although lower or higher number average molecular weights may be used when desired.

The inherent viscosity of the polyhydroxy-functional polyester resin is often in the range of from 0.1 to 0.5 deciliters/gram. Lower or higher inherent viscosities can be used when desired.

In most instances the polyhydroxy-functional polyester resin used in the present invention is semi-crystalline, that is, the polyester has a discernible crystallization or melting point by differential scanning calorimetry (DSC). Nevertheless the polyhydroxy-functional polyester resin used in the present invention may be amorphous, that is the polyester exhibits no, or only a trace of, crystallization or melting point as determined by differential scanning calorimetry.

The polyepoxy-functional reactive organic resin which may be used in the invention may also be widely varied. As used herein and in the claims, the term "polyepoxy-functional" means that on a number average molecular weight basis, the resin contains on average, more than one epoxy group per molecule. Preferably the resin contains, on average, at least two hydroxyl groups per molecule. Of particular interest are the polyglycidyl ethers of polyhydric alcohols. Useful polyglycidyl ethers of polyhydric alcohols can be formed by reacting epihalohydrins, such as epichlorohydrin [CAS 106-89-8], with polyhydric alcohols, especially dihydric alcohols, in the presence of an alkali condensation and dehydrohalogenation catalyst such as sodium hydroxide or potassium hydroxide. Inasmuch as phenolic hydroxyls react with epichlorohydrin in much the same way as aliphatic alcoholic hydroxyls, compounds having at least two phenolic hydroxyls are, for purposes of the present discussion, regarded as polyhydric alcohols. Suitable polyhydric alcohols can be aromatic, aliphatic or cycloaliphatic.

Examples of suitable aliphatic polyhydric alcohols include, but are not limited to, aliphatic dihydric alcohols such as:
ethylene glycol [CAS 107-21-1],
neopentyl glycol [CAS 126-30-7],
diethylene glycol [CAS 111-46-6],
triethylene glycol [CAS 112-27-6],
tetraethylene glycol [CAS 112-60-7],
dipropylene glycol [CAS 110-98-5],
1,2-propanediol [CAS 57-55-6],
1,3-propanediol [CAS 504-63-2],
1,2-butanediol [CAS 26171-83-5],
1,3-butanediol [CAS 107-88-0],
2,3-butanediol [CAS 513-85-9],
1,4-butanediol [CAS 110-63-4],
1,2-pentanediol [CAS 5343-92-0],
1,4-pentanediol [CAS 626-95-9],
2,4-pentanediol [CAS 625-69-4],
1,5-pentanediol [CAS 111-29-5],
1,6-hexanediol [CAS 629-11-8],
3-hydroxy-2,2-dimethylpropyl 3-hydroxy-2,2-dimethylpropanoate [Ester Diol 204; CAS 1115-20-4],
poly(ethylene oxide) [CAS 25322-68-3], and
poly(propylene oxide) [CAS 25322-69-4].

Examples of suitable aliphatic polyhydric alcohols having more than two alcoholic hydroxyl groups include, but are not limited to:
sorbitol [CAS 50-70-4],
mannitol [CAS 69-65-8],
glycerol [CAS 56-81-5],
1,2,6-hexanetriol [CAS 106-69-4],
erythritol [CAS 149-32-6],
pentaerythritol [CAS 115-77-5],
dipentaerythritol [CAS 126-58-9],
tripentaerythritol [CAS 78-24-0],
1,1,1-trimethylolethane [CAS 77-85-0], and
1,1,1-trimethylolpropane [CAS 77-99-6].

Examples of suitable aromatic polyhydric alcohols include:
mpyrocatechol [CAS 120-80-9], resorcinol [CAS 108-46-3],
hydroquinone [GAS 123-31-9],
4,4'-(1-methylethylidene)bis[phenol] [bisphenol A; CAS 80-05-7],
4,4'-(1-methylethylidene))bis[2,6-dibromophenol] [tetrabromobisphenol A; CAS 79-94-7],
4,4'-(1-methylethylidene))bis[2,6-dichlorophenol] [tetrachlorobisphenol A; CAS 79-95-8],
4,4'-(1-methylpropylidene)bis[phenol] [bisphenol B; CAS 77-40-73.
4,4'-(1-methylethylidene)bis(2-methylphenol] [bisphenol C; CAS 79-97-0],
4,4'-(1,2-ethanediyl)bis[phenol] [bisphenol E; CAS 6052-84-2],
2,2'-methylenebis[phenol] [bisphenol F; CAS 2467-02-9),
4,4'-(1-methylethylidene)bis[2-(1-methylethyl)phenol] [bisphenol G; CAS 127-54-8],
4,4'-[1,3-phenylenebis(1-methylethylidene)]bis[phenol] [bisphenol M; CAS 13595-25-0],
4,4'-[1,4-phenylenebis(1-methylethylidene)]bistphenol] [bisphenol P; CAS 2167-51-3],
4,4'-sulfonylbis[phenol] [bisphenol S; CAS 80-09-1],
4,4¹-cyclohexylidenebis[phenol] [bisphenol Z; CAS 843-55-0],
4,4'-(2,4,8,10-tetraoxaspiro[5.5]undecane-3,9-diyldi-2,1-ethanediyl)bis[phenol] [bisphenol PA; CAS 3616-75-9],
4,4'-(1-phenylethylidene)bis[phenol] [bisphenol ACP; CAS 1571-75-1],
4,41-methylenebis[phenol] [HDM; CAS 620-92-8],
2,2'-methylenebis[4-methyl-6-(1-methylethyl)phenol] [bisphenol 2246; CAS 24742-47-0],
3,3-bis(4-hydroxyphenyl)-1(3H)-isobenzofuranone [phenolphthalein; CAS 77-09-8],
4,4'-ethylidenebis[phenol] [CAS 2081-08-5],
4,4'-propylidenebis[phenol] [CAS 1576-13-2],
4,4'-(1-ethylpropylidene)bis[phenol] [CAS 3600-64-4],
4,4'-(1,4-cyclohexanediyl)bis[phenol] [CAS 10466-91-8],
4,4'-(1,3-cyclohexanediyl)bis[phenol] [CAS 55418-36-5],
4,4'-(1,2-cyclohexanediyl)bis[phenol] [CAS 55418-39-8],
4,4'-(phenylmethylene)bis[phenol] [CAS 4081-02-1],
4,4'-(2,2,2-trichloroethylidene)bis[phenol] [hydroxychlor; CAS 2971-36-0],
4-hydroxy-a-(4-hydroxyphenyl)benzeneacetic acid, butyl ester [CAS 71077-33-3],
4,4'-(diphenylmethylene)bis[phenol] [bisphenol TP; CAS 1844-01-5],
4,4'-thiobis[phenol] [CAS 2664-63-3],
1,2-dihydroxynaphthalene [CAS 574-00-5],
1,3-dihydroxynaphthalene [CAS 132-86-5],
1,4-dihydroxynaphthalene [CAS 571-60-8],
1,5-dihydroxynaphthalene [CAS 83-56-7],
1,1,3-tris(4-hydroxyphenyl)propane, phenol-formaldehyde novolac, and o-cresol-formaldehyde novolac.

Many ethylene oxide or propylene oxide extended aromatic polyhydric alcohols are known and may be used when desired.

Examples of suitable cycloaliphatic polyhydric alcohols include, but are not limited to:
1,2-cyclohexanediol [CAS 931-17-9],
1,3-cyclohexanediol [CAS 504-01-8],
1,4-cyclohexanediol [CAS 556-48-9],
1,2-cyclohexanedimethanol [CAS 3971-29-7],
1,3-cyclohexanedimethanol [CAS 3971-28-6],
1,4-cyclohexanedimethanol [CAS 105-08-8],
4,4'-(1-methylethylidene)bis[cyclohexanol] [hydrogenated bisphenol A; CAS 80-05-7].

Another useful class of polyepoxy-functional resins containing at least two epoxy groups per molecule, are those containing, on average, at least two epoxycycloaliphatic groups per molecule. These resins may be made by epoxidation of the cycloalkene group using a peracid such as peracetic acid.

An example of a resin that contains one epoxycycloalkyl group and a pendent epoxy group is 1-(epoxyethyl)-3,4-epoxycyclohexane [CAS 106-87-6].

Examples of epoxy-functional resins containing two or more epoxycycloalkyl groups include, but are not limited to: bis(2,3-epoxycyclopentyl) ether [CAS 2386-90-5],
3,4-epoxycyclohexylmethyl 3,,4,-epoxycyclohexanecarboxylate [CAS 2386-87-0],
bis(3,4-epoxycyclohexyl) adipate [CAS 83996-66-1], and
bis(3,4-epoxycyclohexylmethyl) 4,5-epoxycyclohexane-1,2-dicarboxylate [CAS 21678-82-0].

Poly(primary amino) -functional and poly(secondary amino)-functional compounds may be used to chain-extend the polyepoxy-functional resins.

Suitable polyepoxy-functional resins usually have an epoxide equivalent weight (i.e., molecular weight of resin per epoxide group) in the range of from 100 to 4000, as measured by titration with perchloric acid using methyl violet as an indicator. Often the polyepoxy-functional resins have an epoxide equivalent weight in the range of from 170 to 700. Preferably the epoxide equivalent weight is in the range of from 250 to 600. Other useful polyepoxides are disclosed in U.S. Pat. No. 5,820,987 at column 4, line 52 through column 6, line 59. The disclosure of U.S. Pat. No. 5,820,987 is, in its entirety, incorporated herein by reference.

Many of the polyepoxy-functional organic resins formed by reacting diols with epichlorohydrin also contain polyhydroxy-functionality. In the case of reaction of bisphenol A with epichlorohydrin, ideal reaction products having number average molecular weights of greater than 624 theoretically have, on average, two epoxy groups and more than one hydroxyl group per molecule. Examples of suitable commercially available polyepoxy-functional and polyhydroxy-functional resins are Epon® 828, 836, and 880 is epoxy resins. If the number average molecular weight is 908 or greater, ideal reaction products of bisphenol A and E epichlorohydrin theoretically have, on average, two epoxy groups and at least two hydroxyl group per molecule. Examples of such polyepoxy-functional and polyhydroxy-functional resins which are commercially available are Epon® 1001F, 1002, 1004, 1007, and 1009. The Epon® resins are available from Shell Chemicals Co., Houston, Tex., USA.

The polyepoxy-functional resin may be reacted with various terminating agents, as for example amino-functional siloxane, to convert some, or even all, of the terminal epoxy groups to terminal groups of other functionality. In most instances, the consumption of the epoxy groups during the termination reaction is accompanied by the generation of hydroxy groups on the resin.

Reactive waxes are long-chain aliphatic substances which have at least one reactive group having an active hydrogen, usually selected from hydroxyl, amido, ureylene, carbamyl, and carbamyloxy, and which have the physical characteristics commonly associated with waxes. The reactive waxes comprise many different classes of compounds. Examples of reactive waxes include normal primary alkanols having from 12 to 20 carbon atoms, normal primary amines having from 12 to 20 carbon atoms, normal saturated monocarboxylic acids having from 8 to 20 carbon atoms, and normal saturated monocarboxylic amides having from 8 to 20 carbon atoms. Although the normal (that is, straight chain) structures are preferred, some branching may be present, as for example isostearyl alcohol. Other examples of reactive waxes include the poly(ethylene oxides) having normal molecular weights of at least 1000, the poly(propylene oxides) having normal molecular weights of at least 5000; these may be terminated with two hydroxyl groups or with one hydroxyl group and one lower alkoxy group. Saturated long chain aliphatic diols or saturated long chain dicarboxylic acids having waxy characteristics may also be used. While saturated compounds are preferred, a small amount of unsaturation may be present, as for example oleic acid. Similarly more than one reactive group may be in the molecule, as for example 12-hydroxystearic acid and sebacic acid. Of the reactive waxes, the normal primary alkanols having from 12 to 20 carbon atoms are preferred. Stearyl alcohol is especially preferred.

Color-imparting pigments used in formulating the pigmented coating compositions are finely divided solid powders, insoluble but wettable under the conditions of use. They confer substantial color (which includes white, black and grey) to the pigmented coating compositions of the invention and to coatings formed from such pigmented coating compositions. Finely divided solid powders which do not impart substantial color to the coating compositions and to coatings formed therefrom are, for purposes of the present invention, considered not to be pigments, but rather, they are considered to be substantially colorless fillers.

The color-imparting pigments may be widely varied. They may be organic or inorganic. It is preferred to use color-imparting pigments which do not contain heavy metals although some heavy metals such as copper which are not very toxic in the concentrations employed, may be present. In general it is preferred to use titanium dioxide as a white pigment and carbon in one of its forms as a black pigment, and to use organic pigments for imparting colors other than white, black, or grey. Examples of color-imparting pigments include, but are not limited to:
Carbon Black
Lampblack
Furnace Black
Thermal Decomposition Black
Vegetable Black
Animal Black
Bone Black
Impingement Carbon Black
Graphite
Rutile [CAS 1317-80-2]
Anatase [CAS 1317-70-0]
Clay
Aluminum Hydroxide
Pigment Black 6 [CAS 1333-86-4]
Pigment Black 7 [CAS 1333-86-4]
Pigment Black 10 [CAS 7282-42-5]
Pigment White 6 [CAS 13463-67-7]
Pigment Blue 1 [CAS 1325-87-7],
Pigment Blue 15 [CAS 147-14-8],
Pigment Blue 19 [CAS 58569-23-6],
Pigment Blue 24 [CAS 6548-12-5],
Pigment Blue 60 [CAS 81-77-6],
Pigment Green 4 [CAS 61725-50-6],
Pigment Green 7 [CAS 1328-53-6],
Pigment Green 36 [CAS 14302-13-7],
Pigment Yellow 3 [CAS 6486-23-2],
Pigment Yellow 12 [CAS 6358-85-6],
Pigment Yellow 13 [CAS 5102-83-0],
Pigment Yellow 74 [CAS 6358-31-2],
Pigment Yellow 83 [CAS 5567-15-7],
Pigment Yellow 93 [CAS 5580-57-4],
Pigment Yellow 96 [CAS 5280-80-8],
Pigment Yellow 110 [CAS 5590-18-1],
Pigment Yellow 138 [CAS 56731-19-2],
Pigment Yellow 139 [CAS 36888-99-0],
Pigment Yellow 154 [CAS 63661-02-9],
Pigment Yellow 168 [CAS 71832-85-4],
Pigment Yellow 191 [CAS 129423-54-7],
Pigment Orange 5 [CAS 3468-63-1],
Pigment Orange 13 [CAS 3520-72-7],
Pigment Orange 36 [CAS 12236-62-3],
Pigment Orange 43 [CAS 4424-06-0],
Pigment Red 2 [CAS 6041-94-7],
Pigment Red 3 [CAS 2425-85-6],
Pigment Red 5 [CAS 6410-41-9],
Pigment Red 17 [CAS 6655-84-1],
Pigment Red 23 [CAS 6471-49-4],
Pigment Red 38 [CAS 6358-87-8],
Pigment Red 52 [CAS 17852-99-2],
Pigment Red 57 [CAS 5281-04-9],
Pigment Red 112 [CAS 6535-46-2],
Pigment Red 122 [CAS 980-26-7],
Pigment Red 123 [CAS 24108-89-2],
Pigment Red 144 [CAS 5280-78-4],
Pigment Red 170 [CAS 2786-76-7],
Pigment Red 177 [CAS 4051-63-2],
Pigment Red 179 [CAS 5521-31-3],
Pigment Red 202 [CAS 68859-50-7],
Pigment Red 254 [CAS 122390-98-1],
Pigment Violet 19 [CAS 1047-16-1], and
Pigment Violet 23 [CAS 6358-30-1].

Only one color-imparting pigment or a mixture of two or more color-imparting pigments may be used.

Organic isocyanates react with organic compounds containing at least one "active hydrogen", i.e., a hydrogen atom replaceable by sodium. Substantially all organic compounds containing a hydrogen atom attached to oxygen or is nitrogen will react with isocyanates under the proper conditions. An organic compound containing active hydrogen is suitable as a blocking agent if the product of its reaction with an isocyanate is unreactive with hydroxyl, amino, amido, ureylene, carbamyl, carbamyloxy, or other groups containing active hydrogen at room temperature, but reacts, by intermediate unblocking or otherwise, with one or more such groups of other compounds at an elevated temperature, usually in the range of from 90° C. to 325° C., to form desired products. The reaction product of a blocking agent and an isocyanate is known as a "blocked isocyanate" Although it is not desired to be bound by any theory, it is believed that the reaction to form the blocked isocyanate is reversed at the elevated temperature to regenerate isocyanato-functionality which then reacts with other compounds containing active hydrogen to form the desired products. In most instances the blocking agent contains active hydrogen attached to an oxygen atom or a nitrogen atom.

Any suitable aliphatic, cycloaliphatic, aromatic-alkyl monoalcohol or phenolic compound may be used as a blocking agent in accordance with the present invention.

Examples include but are by no means limited to methyl alcohol, ethyl alcohol, chloroethyl alcohol, propyl alcohol, isopropyl alcohol, butyl alcohol, amyl alcohol, hexyl alcohol, heptyl alcohol, octyl alcohol, nonyl alcohol, 3,3,5-trimethylhexanol, decyl alcohol, lauryl alcohol, cyclopentanol, cyclohexanol, phenylcarbinol, methylphenylcarbinol, ethylene glycol monoethyl ether, ethylene glycol monobutyl ether, phenol, cresol, xylenol, nitrophenol, chlorophenol, ethylphenol, tert-butylphenol, 2,5-di-tert-butyl-4-hydroxytoluene, tertiary hydroxylamines such as diethylethanolamine, oximes such as methyl ethyl ketone oximes, acetone oxime, and cyclohexanone oxime.

Any suitable compound containing amine, amide, urea, urethane, or other groups having an active hydrogen attached to a nitrogen atom may be used. Examples of such compounds include, but are not limited to, dibuzylamine, diisopropylamine, 2-phenylimidazoline, benzotriazole, benzyl methacrylohydroxamate, and &-caprolactam.

Polyfunctional blocking agents may be used when desired. Examples include, but are not limited to ethylene glycol, propropylene glycol, poly(ethylene glycol), poly (propylene glycol), Pluronic type polypropylene, poly (tetrahydrofuran), trimethylolpropane, ethoxylated trimethylolpropane, and poly(vinyl alcohol).

Procedures for blocking isocyanato groups are well known in the art. Blocking is often accomplished by reacting the isocyanato groups of the isocyanato-functional compound with blocking agent at temperatures in the range of from 25° C. to 120° C., although other temperatures may often be used.

The organic blocked isocyanate is formed by reacting a sufficient quantity of blocking agent with the organic polyisocyanate to insure that substantially no unreacted isocyanato groups are present in the product.

It should be noted that blocked isocyanato functionality does not contain the isocyanato group; rather it contains a group which is the reaction product of the isocyanato group and the blocking agent. For example, an isocyanato group blocked with an alcohol contains a urethane group, while an isocyanato group blocked with a primary amine contains a urea group.

In the preparation of the blocked organic polyisocyanates, any suitable organic polyisocyanate may be used. Examples of classes of organic polyisocyanates include, but are not limited to, the aliphatic polyisocyanates, the cycloaliphatic polyisocyanates, the aliphatic-cycloaliphatic polyisocyanates, the aromatic polyisocyanates, and the aliphatic-aromatic polyisocyanates. The polyisocyanates may be diisocyanates, triisocyanates, tetraisocyansates or higher order isocyanates.

Only one polyisocyanate or a mixture of two or more polyisocyanates may be used. When mixtures are used, the constituent polyisocyanates may be from the same class or from different classes.

Representative examples of suitable polyisocyanates include, but are not limited to, 1,2-diisocyanatopropane,
1,3-diisocyanatopropane,
1,2-diisocyanato-2-methylpropane,
1,2-diisocyanatobutane,
1,3-diisocyanatobutane,
1,4-diisocyanatobutane,
1,5-diisocyanatopentane,
1,6-diisocyanatohexane,
ethylidine diisocyanate,
butylidene diisocyanate,
1,2-diisocyanatocyclopentane,
1,3-diisocyanatocyclopentane,
1,2-diisocyanatocyclohexane,
1,3-diisocyanatocyclohexane,
1,4-diisocyanatocyclohexane,
bis(4-isocyanatocyclohexyl) ether,
1-(isocyanatomethyl)-5-isocyanato-1,3,3-trimethylcyclohexane,
1-(isocyanatomethyl)-1-(3-isocyanatopropyl)cyclohexane,
bis(4-isocyanatocyclohexyl)methane,
1,2-diisocyanatobenzene,
1,3-diisocyanatobenzene,
1,4-diisocyanatobenzene,
4,4'-diisocyanatobiphenyl,
1,4-diisocyanatonaphthalene,
1,5-diisocyanatonaphthalene,
bis(4-isocyanatophenyl)methane,
2,4-disocyanatotoluene,
2,6-diisocyanatotoluene,
1,3-bis(isocyanatomethyl)benzene,
1,4-bis(isocyanatomethyl)benzene,
bis(4-isocyanatophenyl) ether,
3,3,-diisocyanatobiphenyl,
4,4'-diisocyanatobiphenyl,
4,4'-diisocyanato-2,2'-dimethylbiphenyl,
4,4'-diisocyanato-3,3'-dimethylbiphenyl,
4,4'-diisocyanato-2,2'-dimethoxybiphenyl,
4,4'-diisocyanato-3,3'-dimethoxybiphenyl,
tris(4-isocyanatophenyl)methane,
tris(4-isocyanatocyclohexyl)methane,
1,3,5-triisocyanatobenzene,
2,4,6-triisocyanatotoluene,
bis(2,5-diisocyanato-4-methylphenyl)methane,
bis(2,5-diisocyanato-4-methylcyclohexyl)methane,
polymeric polyisocyanates such as dimers and trimers, and prepolymers which are derived from a polyol, including a hydrocarbon polyol, a polyether polyol, and a polyester polyol. An example is an adduct (approximately 3:1, molar) of 1-isocyanatomethyl-5-isocyanato-1,3,3-trimethylcyclohexane [CAS 4098-71-9] and 1,1,1-trimethylolpropane [CAS 77-99-6].

The relative proportions of the components of the pigmented coating composition may be widely varied.

The reactive organic resin which is polyhydroxy-functional, polyepoxy-functional, or both polyepoxy-functional and polyhydroxy-functional usually constitutes from 20 to 80 percent by weight of the pigmented coating composition. is Often such reactive organic resin constitutes from 30 to 70 percent by weight of the pigmented coating composition. From 40 to 60 percent by weight of the pigmented coating composition is preferred.

The reactive wax usually constitutes from 0.1 to 20 percent by weight of the pigmented coating composition. In many instances the reactive wax constitutes from 0.5 to percent by weight of the pigmented coating composition. From 1 to 10 percent by weight of the pigmented coating composition is preferred.

The color-imparting pigment ordinarily constitutes from 1 to 45 percent by weight of the pigmented coating composition. Frequently the color-imparting pigment constitutes from 3 to 40 percent by weight of the pigmented coating composition. From 5 to 35 percent by weight of the pigmented coating composition is preferred.

The blocked polyisocyanate ordinarily constitutes from 0.5 to 12 percent by weight of the pigmented coating composition. Frequently the blocked polyisocyanate constitutes from 1 to 9 percent by weight of the pigmented coating composition. From 1.5 to 8 percent by weight of the pigmented coating composition is preferred.

The amino-functional curing agents used in one or more of the pigmented coating compositions are themselves known curing agents for epoxy resins. Such amino-functional curing agents are reasonably shelf stable at ambient room temperatures, and sufficiently stable at application temperatures so that they do not unduly shorten the pot lives of the pigmented coating compositions in which they are employed.

Illustrative amino-functional curing agents which may be used include melamine, 2,4,6-tris(alkoxycarbonylamino)-1, 3,5-triazine (also known as "TACT") where each alkoxy independently contains from 1 to 4 carbon atoms, and compounds represented by the formula:

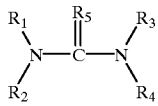

wherein:

$R_1$, $R_2$, $R_3$ each independently represents hydrogen, alkyl containing from 1 to 3 carbon atoms, or hydroxyalkyl containing from 1 to 3 carbon atoms, $R_4$ represents hydrogen, phenyl, cyano, acetyl, or

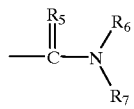

$R_5$ represents O, S, or NH, and $R_6$ and $R_7$ each independently represents hydrogen, alkyl containing from 1 to 3 carbon atoms, hydroxyalkyl containing from 1 to 3 carbon atoms, or phenyl.

When any of $R_1$, $R_2$, $R_3$, $R_6$, and $R_7$ is alkyl containing from 1 to 3 carbon atoms, it is independently methyl, ethyl, propyl, or isopropyl. The alkyl groups may be the same or some may be different from the others. The preferred alkyl group is methyl.

When any of $R_1$, $R_2$, $R_3$, $R_6$, and $R_7$ is hydroxyalkyl containing from 1 to 3 carbon atoms, it usually is independently hydroxymethyl, hydroxyethyl, or hydroxypropyl. The hydroxyalkyl groups may be the same or some may be different from the others. The preferred hydroxyalkyl group is hydroxymethyl.

Preferably, all of $R_1$, $R_2$, $R_3$, $R_4$, and $R_7$ are hydrogen.

Examples of suitable amino-functional curing agents include melamine [CAS 108-78-1], 2,4,6-tris (methoxycarbonylamino)-1,3,5-triazine [CAS 150986-36-0], 2,4,6-tris(butoxycarbonylamino)-1,3,5-triazine [CAS 150986-45-1], dicyandiamide [CAS 461-58-5], 1,3-diphenylguanidine [CAS 102-06-7], urea [CAS 57-13-6], thiourea [CAS 62-56-6], acetylurea [CAS 591-07-1], biguanide [CAS 56-03-1], heptamethylbiguanide [CAS 91446-22-9], 2-ethyl-4-methylimidazole [CAS 931-36-2], and diaminodiphenyl sulfone [CAS 80-08-0].

The amino-functional curing agent may comprise one amino-functional curing agent compound or it may comprise a mixture of two or more amino-functional curing agent compounds.

The amino-functional curing agent usually constitutes from 1 to 25 percent by weight of the pigmented coating composition in which it is employed. Often the amino-functional curing agent constitutes from 3 to 20 percent by weight of the pigmented coating composition in which it is employed. From 5 to 15 percent by weight of the pigmented coating composition in which it is employed is preferred.

When desired the outermost coating of the sequence may optionally be overlain with a coating of substantially clear overcoating composition which comprises reactive organic resin which is polyhydroxy-functional, polyepoxy-functional, or both epoxy-functional and hydroxy-functional. The substantially clear overcoating composition may contain amino-functional curing agent or it may be substantially free of amino-functional curing agent. Upon heating to the elevated curing temperature, the substantially clear overcoating composition is crosslinked together with the pigmented coating compositions.

It should be noted that although the outermost crosslinked coating formed from the substantially clear overcoating composition is itself substantially clear, some small amount of dye and/or color-imparting pigment may optionally be present to provide some tinting; the coloration, however, should not be so severe that the underlying lettering, designs, or other indicia cannot easily be seen. Preferably the substantially clear outermost crosslinked coating and the substantially clear overcoating composition from which it is formed are substantially free of dye. Similarly, the substantially clear outermost crosslinked coating and the substantially clear overcoating composition from which it is formed are preferably substantially free of color-imparting pigment.

The relative proportions of the components of the substantially clear overcoating composition may be widely varied.

The reactive organic resin which is polyhydroxy-functional, polyepoxy-functional, or both polyepoxy-functional and polyhydroxy-functional usually constitutes from 20 to 90 percent by weight of the substantially clear overcoating composition. Often such reactive organic resin constitutes from 65 to 90 percent by weight of the substantially clear overcoating composition. From 75 to 90 percent by weight of the substantially clear overcoating composition is preferred.

When present, the amino-functional curing agent is usually constitutes from 1 to 25 percent by weight of the overcoating composition. Often the amino-functional curing agent constitutes from 3 to 20 percent by weight of the overcoating composition. From 5 to 15 percent by weight of the overcoating composition is preferred.

Reactive wax is a material that may optionally be present in the substantially clear overcoating composition. When present, reactive was usually constitutes from 0.1 to 20 percent by weight of the substantially clear overcoating composition. In many instances the reactive wax constitutes from 0.5 to 15 percent by weight of the substantially clear overcoating composition. From 1 to 10 percent by weight of the substantially clear overcoating composition is preferred.

Blocked polyisocyanate is another material that may optionally be present in the substantially clear overcoating composition. When present, the blocked polyisocyanate ordinarily constitutes from 2 to 80 percent by weight of the substantially clear overcoating composition. Frequently the blocked polyisocyanate constitutes from 5 to 75 percent by weight of the substantially clear overcoating composition. From 10 to 65 percent by weight of the substantially clear overcoating composition is preferred.

Organo-functional siloxane selected from the group consisting of epoxy-functional siloxane, amino-functional siloxane, (blocked isocyanato)-functional siloxane, and a mixture of two or more thereof, is an optional material which may be employed in one or more of the pigmented coating compositions, in the substantially clear overcoating composition, or in both the pigmented coating compositions and in the substantially clear overcoating composition. Preferably, but not necessarily, the organo-functional siloxane is present in the pigmented coating composition which is applied directly to the ceramic substrate, since the organo-functional siloxane enhances bonding between the crosslinked coating and the ceramic substrate. The organo-siloxane may be optionally present in any coating composition (whether an overcoating composition or a pigmented coating composition) which is applied to other previously applied coating compositions.

Usually, but not necessarily, the epoxy-functional siloxane is selected from the group consisting of:
(ω-(glycidyloxy)alkyl)trialkoxysilane,
(ω-(glycidyloxy)alkyl)dialkoxyalkylsilane,
(ω-(glycidyloxy)alkyl)alkoxydialkylsilane,
(ω-(3,4-epoxycyclohexyl)alkyl)trialkoxysilane, and a mixture of two or more thereof.

Examples of suitable epoxy-functional silanes include:
(2-(glycidyloxy)ethyl)dimethoxymethylsilane [CAS 171609-54-4],
(2-(glycidyloxy)ethyl)trimethoxysilane [CAS 20526-39-0],
(2-(glycidyloxy)ethyl)triethoxysilane [CAS 56325-91-8],
(3-(glycidyloxy)propyl)methoxydimethylsilane [CAS 100303-57-9],
(3-(glycidyloxy)propyl)dimethoxymethylsilane [CAS 65799-47-5],
(3-(glycidyloxy)propyl)ethoxydimethylsilane [CAS 17963-04-1],
(3-(glycidyloxy)propyl)diethoxymethylsilane [CAS 2897-60-1],
(3-(glycidyloxy)propyl)trimethoxysilane [CAS 2530-83-8],
(3-(glycidyloxy)propyl)diethoxyethylsilane [CAS 99388-21-3],
(3-(glycidyloxy)propyl)triethoxysilane [CAS 2602-34-8],
(2-(3,4-epoxycyclohexyl)ethyl)trimethoxysilane [CAS 3388-04-3],
(2-(3,4-epoxycyclohexyl)ethyl)triethoxysilane [CAS 10217-34-2],
(3-(3,4-epoxycyclohexyl)propyl)trimethoxysilane [CAS 33684-79-6], and
(3-(3,4-epoxycyclohexyl)propyl)triethoxysilane [CAS 156183-90-3].
Only one epoxy-functional siloxane or a mixture of two or more epoxy-functional siloxanes may be used when desired.

Usually, but not necessarily, the amino-functional siloxane comprises a member selected from the group consisting of:
(ω-aminoalkyl)trialkoxysilane,
(ω-aminoalkyl)dialkoxyalkylsilane,
(ω-aminoalkyl) alkoxydialkylsilane,
and a mixture of two or more thereof.

Examples of suitable amino-functional silane's include:
(2-aminoethyl)dimethoxymethylsilane [CAS 115599-33-2],
(2-aminoethyl)trimethoxysilane [CAS 65644-31-7],
(2-aminoethyl)triethoxysilane [CAS 45074-31-5],
(3-aminopropyl)methoxydimethylsilane [CAS 31024-26-7],
(3-aminopropyl)dimethoxymethylsilane [CAS 3663-44-3],
(3-aminopropyl)ethoxydimethylsilane [CAS 18306-79-1],
(3-aminopropyl)diethoxymethylsilane [CAS 3179-76-8],
(3-aminopropyl)trimethoxysilane [CAS 13822-56-5],
(3-aminopropyl)diethoxyethylsilane [CAS 20723-29-9], and
(3-aminopropyl)triethoxysilane [CAS 919-30-2].
Only one amino-functional siloxane or a mixture of two or more amino-functional siloxanes may be used when desired.

Isocyanato groups of isocyanato-functional siloxanes may be reacted with blocking agents to form (blocked isocyanato)-functional siloxanes. The principles, blocking agents, and blocking procedures are substantially the same as those described above in respect of the formation of blocked polyisocyanates.

Usually, but not necessarily, the (blocked isocyanato)-functional siloxane is selected from the group consisting of:
((blocked isocyanato)alkyl)trialkoxysilane,
((blocked isocyanato)alkyl)dialkoxyalkylsilane,
((blocked isocyanato)alkyl)alkoxydialkylsilane,
is and a mixture of two or more thereof.

Preferably the (blocked isocyanato)-functional siloxane is selected from the group consisting of:
(ω-(blocked isocyanato)alkyl)trialkoxysilane,
(ω-(blocked isocyanato)alkyl) dialkoxyalkylsilane,
(ω-(blocked isocyanato)alkyl)alkoxydialkylsilane,
and a mixture of two or more thereof.

Examples of suitable isocyanato-functional siloxanes which may be blocked include:
(3-isocyanatopropyl)trimethoxysilane [CAS 15396-00-6],
(3-isocyanatopropyl)diethoxyethylsilane [CAS 119262-02-1], and
(3-isocyanatopropyl)triethoxysilane [CAS 24801-88-5].

The (blocked isocyanato)-functional siloxanes corresponding to these exemplary isocyanato-functional siloxanes are:
(3-(blocked isocyanato)propyl)trimethoxysilane,
(3-(blocked isocyanato)propyl)diethoxyethylsilane, and
(3-(blocked isocyanato)propyl)triethoxysilane.
Only one (blocked isocyanato)-functional siloxane or a mixture of two or more (blocked isocyanato)-functional siloxanes may be used when desired.

Only one organo-functional siloxane or a mixture of two or more organo-functional siloxanes may be used when desired.

When present in a pigmented coating composition, the organo-functional siloxane usually constitutes from 0.01 to 15 percent by weight of the pigmented coating composition. In many instances the organo-functional siloxane constitutes from 2 to 10 percent by weight of the pigmented coating composition. From 4 to 6 percent by weight of the pigmented coating composition is preferred.

When present in the substantially clear overcoating is composition, the organo-functional siloxane usually constitutes from 0.01 to 15 percent by weight of the substantially clear overcoating composition. In many instances the organo-functional siloxane constitutes from 2 to 10 percent by weight of the substantially clear overcoating composition. From 4 to 6 percent by weight of the substantially clear overcoating composition is preferred.

Substantially colorless fillers are materials which may optionally be present in one or more of the pigmented coating compositions, in the substantially clear overcoating composition, or in both the pigmented coating compositions and in the overcoating composition. Such fillers are finely divided particulate solids which impart little or no color to the final coatings. The fillers usually have a maximum dimension of less than 500 nanometers. Often the fillers have a maximum dimension of less than 100 nanometers. Frequently the maximum dimension is less than 50 nanometers. In many instances the maximum dimension is less than 20 nanometers. Often the maximum dimension is in the range of from 5 to 20 nanometers. Preferably the fillers are hydrophobic. Examples of suitable hydrophobic fillers include Aerosil® fumed silicas designated R972, R974, R812, R812S, R805 (Degussa Corporation, Ridgefield Park, N.J., USA). Only one substantially colorless filler or a mixture of two or more substantially colorless fillers may be used when desired.

When present in a pigmented coating composition, the substantially colorless filler ordinarily constitutes from 0.01 to 20 percent by weight of the pigmented coating composition. In many instances the substantially colorless filler constitutes from 1 to 10 percent by weight of the pigmented coating composition. From 2 to 5 percent by weight of the pigmented coating composition is preferred.

When present in the substantially clear overcoating is composition, the substantially colorless filler ordinarily constitutes from 0.01 to 20 percent by weight of the substantially clear overcoating composition. In many instances the substantially colorless filler constitutes from 4 to 15 percent by weight of the substantially clear overcoating composition. From 6 to 12 percent by weight of the substantially clear overcoating composition is preferred Many other additional materials may be optionally present in the substantially clear overcoating composition and/or in one or more of the pigmented coating compositions. Among these are included dyes, antioxidants, degassing aids, flow modifiers, and fluorescent whitening agents. These are only exemplary; others may be used as desired.

When present, the additional optional materials are ordinarily present in a pigmented coating composition and/or in the substantially clear overcoating composition in their customary amounts for their customary purposes. In many instances the additional optional materials, when present, will constitute from 0.01 to 15 percent by weight of the substantially clear overcoating composition or the pigmented coating composition. Frequently the additional optional materials, when present, will constitute from 0.01 to 10 percent by weight of the substantially clear overcoating composition or the pigmented coating composition.

The substantially clear overcoating composition and the pigmented coating compositions may be formed by admixing the respective ingredients at temperatures below those which would cause significant reaction.

The pigmented coating compositions of the present invention can be applied directly to ceramic substrates and/or to one or more previously applied coatings of the same or similar pigmented coating compositions. Usually they are applied at elevated temperatures so that the chilling effect of the cooler substrate will quickly substantially solidify the coating. Such solidification is helpful in maintaining fine-line definition, in permitting application of multiple coatings without impairing the definition of any previously applied coating, and in permitting multiple coating while avoiding energy-inefficient crosslinking between coating applications. When multiple coatings are applied to the same area, it is advantageous for the application temperature of a subsequently applied coating to be lower than the temperature at which a previously applied coating will liquefy or unduly soften. This will enhance preservation of the fine-line definition and resolution of the previously applied coating.

Since most of these pigmented coating compositions substantially instantly solidify to the touch after application, they can be advantageously used in coating lines operating at high speeds where bottles or other ceramic substrates are sequentially coated.

The substantially clear overcoating compositions can be applied to one or more coatings of the same or similar substantially clear overcoating compositions, and/or to one or more exposed coatings of pigmented coating compositions. Usually they are applied at elevated temperatures so that the chilling effect of the cooler coating to which it is applied will quickly substantially solidify the applied substantially clear overcoating composition. It is advantageous for the application temperature of the substantially clear overcoating composition to be lower than the temperature at which a previously applied coating will liquefy or unduly soften in order to enhance preservation of the fine-line definition and resolution of the previously applied coating.

Since most of these substantially clear overcoating compositions substantially instantly solidify after application, they can be advantageously used in coating lines is operating at high speeds where bottles or other ceramic substrates are sequentially coated.

In the interest of completeness, however, it should be stated that the last applied coating (whether pigmented or substantially clear) may or may not be dry to the touch before the coatings are crosslinked at elevated temperatures.

After the coatings have been applied, the coated ceramic substrate is heated to elevated temperatures to cure, i.e., crosslink, the coatings.

As used herein and in the claims, "ceramic substrate" is used in its broadest sense, unless otherwise more restrictively qualified. Examples of ceramic substrates include, but are not limited to, unglazed pottery, glazed pottery, unglazed earthenware, glazed earthenware, unglazed porcelain, glazed porcelain, coffee cups, tea cups, wall tiles, Christmas tree ornaments, promotional ware, and glass substrates. Examples of glass substrates include, but are not limited to, window glass, automotive glass, drinking glasses, glass bottles, glass jugs, glass jars, glass pitchers, and glass jewelry.

Application of the coating compositions can be by any technique known to the art. Coating compositions which are applied at elevated temperatures because they are substantially solids at room temperature are usually applied using screen coating techniques. Coating compositions which are liquids at room temperature can be applied by spraying, curtain coating, roller application, printing, and brushing. These techniques are only exemplary; others may be used as desired.

Curing of one or more of the applied coating compositions is accomplished at temperatures higher than those at which the polyisocyanates were blocked. In most instances the curing temperature is at least 150° C. The curing temperature should not be so high as to cause unwanted coloration or other thermal degradation of the coatings. Usually the curing temperature is in the range of from 150° C. to 200° C.

Other than in the operating examples, or where otherwise indicated, all numbers expressing quantities of ingredients or reaction conditions used herein are to be understood as modified in all instances by the term "about"

After all coatings have been applied, the coated ceramic substrate is heated to elevated temperatures to cure, i.e., crosslink, the coatings substantially simultaneously.

The invention is further described in conjunction with the following examples which are to be considered illustrative rather than limiting, and in which all parts are parts by weight and all percentages are percentages by weight unless otherwise specified.

EXAMPLE 1

Epon® 836 bisphenol A diglycidyl ether was first warmed in an oven at 100° C. The materials shown in Table 1 were then charged in the order shown to a mixer and mixed at 100° C. After the last material had been charged, the materials were mixed For 5 minutes at 80° C. to produce a white coating composition.

TABLE 1

| Component | Parts by weight |
| --- | --- |
| Epon ® 836 bisphenol A diglycidyl ether (1) | 5,520.0 |
| Epon ® 1001F bisphenol A diglycidyl ether (1) | 8,280.0 |
| Vestagon ® blocked polyisocyanate (2) | 585.0 |
| Stearyl Alcohol | 994.0 |
| Aerosil ® R974 fumed silica (3) | 411.0 |
| Ti-Pure ® R-706 Titanium Dioxide Pigment (4) | 7,502.0 |
| NeoGen ™ DGH Aluminum Silicate (5) | 552.0 |

TABLE 1-continued

| Component | Parts by weight |
|---|---|
| Aluminum Hydroxide | 276.0 |
| Tinuvin ® 144 Antioxidant (6) | 138.0 |
| Tinuvin ® 900 UV Absorber (7) | 69.0 |
| Modaflow ® Flow Modifier (8) | 276.0 |
| Benzoin | 276.0 |
| Silquest ® A-187 ™ (3-(glycidyloxy)propyl)-trimethoxysilane (9) | 1,535.0 |
| Dyhard ® 100S dicyandiamide (10) | 867.0 |
| Total | 27,281.0 |

(1) [CAS 25068-38-6] Shell Chemicals Co., Houston, Tex., USA.
(2) Vestagon® EP B 1400, believed to be an adduct of isophorone diisocyanate [CAS 4098-71-93, 1,1,1-trimethylolpropane [CAS 77-99-6], and ε-caprolactam [CAS 105-60-2] in a 3:1:3 molar ratio, Huls America, Inc., Piscataway, N.J., USA.
(3) Degussa Corporation, Ridgefield Park, N.J., USA.
(4) E.I. du Pont de Nemours & Co., Wilmington, Del., USA.
(5) Dry Branch Kaolin Co., Dry Branch, Ga., USA.
(6) [CAS 63843-89-0] Ciba Specialty Chemicals, Tarrytown, N.Y., USA.
(7) (CAS 70321-86-7] Ciba Specialty Chemicals, Tarrytown, N.Y., USA.
(8) Ethyl acrylate-co-2-ethylhexyl Acrylate polymer [CAS 26376-86-3] Monsanto Company, St. Louis, Mo., USA.
(9) Witco Corp., Greenwich, Conn., USA.
(10) SKW Trostberg Aktiengesellschaft, Trostberg, Germany.

EXAMPLE 2

Epon® 836 bisphenol A diglycidyl ether was first warmed in an oven at 100° C. The materials shown in Table 2 were charged in the order shown to a mixer and mixed at 80–100° C. to produce a red coating composition.

TABLE 2

| Component | Parts by weight |
|---|---|
| Epon ® 836 bisphenol A diglycidyl ether (11) | 60.0 |
| Epon ® 1001F bisphenol A diglycidyl ether (11) | 60.0 |
| Vestagon ® blocked polyisocyanate (12) | 12.0 |
| Stearyl alcohol | 7.2 |
| Total | 139.2 |

(11) See Example 1, Table 1, note 1.
(12) See Example 1, Table 1, note 2.

While the mixer was running, the materials shown in Table 3 were added in the order shown.

TABLE 3

| Component | Parts by weight |
|---|---|
| Aerosil ® R974 fumed silica (13) | 4.8 |
| Sunfast Red 170 (14) | 14.4 |
| NeoGen ™ DGH Aluminum Silicate (15) | 15.8 |
| Tinuvin ® 144 Antioxidant (16) | 1.0 |

TABLE 3-continued

| Component | Parts by weight |
|---|---|
| Tinuvin ® 900 Antioxidant (17) | 0.8 |
| Modaflow ® Flow Modifier (18) | 1.6 |
| Silquest ® A-187 ™ (3-(glycidyloxy)propyl)-trimethoxysilane (19) | 10.0 |
| Benzoin | 1.6 |
| Total | 50.0 |

(13) See Example 1, Table 1, note 3.
(14) Sun Chemical, Cincinnati, Ohio, USA.
(15) See Example 1, Table 1, note 5.
(16) See Example 1, Table 1, note 6.
(17) See Example 1, Table 1, note 7.
(18) See Example 1, Table 1, note 8.
(19) See Example 1, Table 1, note 9.

EXAMPLE 3

A portion of the white coating composition prepared in Example 1 was printed on a glass bottle using a standard pattern through a Strutz GP-4 Semi-Automatic General Purpose Decorator. A stainless steel screen of 230 mesh was used and the white coating composition was printed at temperatures in the range of from 100° C. to 110° C. The white coating on the glass bottle was substantially instantly dry to the touch. A portion of the red coating composition prepared in Example 2 was substantially immediately printed as a design, partially on the dry white coating on the glass bottle. The red coating composition was printed using a Strutz GP-4 Semi-Automatic General Purpose Decorator. A stainless steel screen of 230 mesh was used and the red coating composition was printed at temperatures in the range of from 80C to 90° C. The printed bottle was cured in a forced air oven at 180° C. for one hour. The resultant image was sharp, clear, and durable. Both red and white prints were found to resist acetone wash. Exposure to 10% caustic at 70° C. for 24 hours caused no change in gloss or appearance.

Although the present invention has been described with reference to specific details of certain embodiments thereof, it is not intended that such details should be regarded as limitations upon the scope of the invention except insofar as they are included in the accompanying claims.

What is claimed is:

1. A method comprising heating to elevated temperature a ceramic substrate having thereon a sequence of coatings of pigmented coating compositions wherein each of said pigmented coating compositions comprises:
   (a) reactive organic resin which is polyhydroxy-functional, polyepoxy-functional, or both epoxy-functional and hydroxy-functional;
   (b) reactive wax;
   (c) color-imparting pigment; and
   (d) blocked polyisocyanate;
wherein:
   (e) the pigmented coating composition of at least is one coating of the sequence is substantially free of amino-functional curing agent; and
   (f) the pigmented coating composition of at least one other coating of the sequence further comprises amino-functional curing agent;
to crosslink all of the pigmented coating compositions of the coatings of the sequence and to adhere the sequence to the ceramic substrate.

2. The method of claim 1 wherein the reactive organic resin comprises polyhydroxy-functional reactive organic resin.

3. The method of claim 2 wherein the polyhydroxy-functional reactive organic resin comprises polyhydroxy-functional polyester resin.

4. The method of claim 3 wherein the polyhydroxy-functional polyester resin contains, on average, at least two hydroxyl groups per molecule.

5. The method of claim 3 wherein the polyhydroxy-functional polyester resin has a hydroxyl number of at least 5.

6. The method of claim 3 wherein the polyhydroxy-functional polyester resin is a polyhydroxy-functional substantially saturated polyester resin.

7. The method of claim 1 wherein the reactive organic resin comprises polyepoxy-functional reactive organic is resin.

8. The method of claim 7 wherein the polyepoxy-functional reactive organic resin contains, on average, at least two epoxy groups per molecule.

9. The method of claim 7 wherein the polyepoxy-functional reactive organic resin comprises polyglycidyl ether of polyhydric alcohol.

10. The method of claim 9 wherein the polyhydric alcohol is bisphenol A.

11. The method of claim 1 wherein the reactive wax is selected from the group consisting of normal primary alkanol having from 12 to 20 carbon atoms, normal saturated monocarboxylic acid having from 8 to 20 carbon atoms, and normal saturated monocarhoxylic amide having from 8 to 20 carbon atoms.

12. The method of claim 1 wherein the reactive wax is stearyl alcohol.

13. The method of claim 1 wherein the blocked polyisocyanate comprises an adduct of isophorone diisocyanate, 1,1,1-trimethylolpropane, and c-caprolactam in a 3:1:3 molar ratio.

14. The method of claim 1 wherein the amino-functional curing agent comprises a member selected from the group consisting of melamine, 2,4,6-tris(alkoxycarbonylamino)-1,3,5-triazine where each alkoxy independently contains from 1 to 4 carbon atoms, a compound represented by the formula:

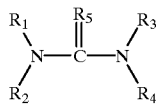

wherein:
R1, R2, and R3 each independently represents hydrogen, alkyl containing from 1 to 3 carbon atoms, or hydroxyalkyl containing from 1 to 3 carbon atoms,
R4 represents hydrogen, phenyl, cyano, acetyl, or

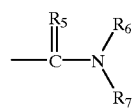

R5 represents O, S, or NH, and
R6 and R7 each independently represents hydrogen, alkyl containing from 1 to 3 carbon atoms, hydroxyalkyl containing from 1 to 3 carbon atoms, or phenyl, and a mixture of two or more thereof.

15. The method of claim 14 wherein the amino-functional curing agent comprises dicyandiamide.

16. The method of claim 1 wherein:
(a) the reactive organic resin constitutes from 20 to 80 percent by weight of each pigmented coating composition;
(b) the reactive wax constitutes from 0.1 to 20 percent by weight of each pigmented coating composition;
(c) the color-imparting pigment constitutes from 1 to 45 percent by weight of each pigmented coating composition;
(d) the blocked polyisocyanate constitutes from 0.5 to 12 percent by weight of each pigmented coating composition; and
(e) the amino-functional curing agent constitutes from 1 to 25 percent by weight of any pigmented coating composition which comprises amino-functional curing agent.

17. The method of claim 1 wherein at least one of the pigmented coating compositions further comprises organo-functional siloxane selected from the group consisting of epoxy-functional siloxane, amino-functional siloxane, (blocked isocyanato)-functional siloxane, and a mixture of two or more thereof.

18. The method of claim 17 wherein the organo-functional siloxane is epoxy-functional siloxane selected from the group consisting of:
(2-(glycidyloxy)ethyl)dimethoxymethylsilane,
(2-(glycidyloxy)ethyl)trimethoxysilane,
(2-(glycidyloxy)ethyl)triethoxysilane,
(3-(glycidyloxy)propyl)methoxydimethylsilane,
(3-(glycidyloxy)propyl)dimethoxymethylsilane,
(3-(glycidyloxy)propyl)ethoxydimethylsilane,
(3-(glycidyloxy)propyl)diethoxymethylsilane,
(3-(glycidyloxy)propyl)trimethoxysilane,
(3-(glycidyloxy)propyl)diethoxyethylsilane,
(3-(glycidyloxy)propyl)triethoxysilane,
(2-(3, 4-epoxycyclohexyl)ethyl)trimethoxysilane,
(2-(3,4-epoxycyclohexyl)ethyl)triethoxysilane,
(3-(3,4-epoxycyclohexyl)propyl)trimethoxysilane,
(3-(3,4-epoxycyclohexyl)propyl)triethoxysilane,
and a mixture of two or more thereof.

19. The method of claim 17 wherein the organo-functional siloxane is amino-functional siloxane is selected from the group consisting of:
(2-aminoethyl)dimethoxymethylsilane,
(2-aminoethyl)trimethoxysilane,
(2-aminoethyl)triethoxysilane,
(3-aminopropyl)methoxydimethylsilane,
(3-aminopropyl)dimethoxymethylsilane,
(3-aminopropyl)ethoxydimethylsilane,
(3-aminopropyl)diethoxymethylsilane,
(3-aminopropyl)trimethoxysilane,
(3-aminopropyl)diethoxyethylsilane,
(3-aminopropyl)triethoxysilane,
and a mixture of two or more thereof.

20. The method of claim 17 wherein the organo-functional siloxane is (blocked isocyanato)-functional siloxane selected from the group consisting of:
(3-(blocked isocyanato)propyl)trimethoxysilane,
(3-(blocked isocyanato)propyl)diethoxyethylsilane,
(3-(blocked isocyanato)propyl)triethoxysilane,
and a mixture of two or more thereof.

21. The method of claim 17 wherein the organo-functional siloxane constitutes from 0.01 to 15 percent is by weight of any pigmented coating composition which comprises organo-functional siloxane.

22. The method of claim 1 wherein the outermost coating of the sequence is overlain with a coating of substantially clear overcoating composition which comprises reactive organic resin which is polyhydroxy-functional, polyepoxy-functional, or both epoxy-functional and hydroxy-functional.

23. The method of claim 1 wherein the elevated temperature is at least 150° C.

24. The method of claim 1 wherein the elevated temperature is in the range of from 150° C. to 200° C.

25. The method of claim 1 wherein the ceramic substrate is glass.

26. The method of claim 1 wherein the ceramic substrate is a glass bottle.

\* \* \* \* \*

UNITED STATES PATENT AND TRADEMARK OFFICE
CERTIFICATE OF CORRECTION

PATENT NO. : 6,214,414 B1          Page 1 of 1
DATED : April 10, 2001
INVENTOR(S) : Robert H. Tang et al.

It is certified that error appears in the above-identified patent and that said Letters Patent is hereby corrected as shown below:

Column 9,
Line 9, change "&-caprolactam" to -- ε-caprolactam --.

Column 18, claim 1,
Line 59, delete "is".

Column 19, claim 7,
Line 17, delete "is".

Column 19, claim 13,
Line 21, "c-caprolactam" should be -- ε-caprolactam --.

Column 20, claim 21,
Line 67, delete "is".

Signed and Sealed this

Sixth Day of November, 2001

*Attest:*

*Nicholas P. Godici*

NICHOLAS P. GODICI
*Attesting Officer*     *Acting Director of the United States Patent and Trademark Office*